United States Patent [19]
Gallagher et al.

[11] 3,811,651
[45] May 21, 1974

[54] BELLOWS SEALED BUTTERFLY VALVE

[75] Inventors: Bernard J. Gallagher; Earl D. Shufflebarger, both of Mentor; David M. Simko, Parma Heights; Richard J. Nedvick, Brooklyn Heights; John R. Boylan, Cleveland Heights; Oliver L. Danko, Chesterland, all of Ohio

[73] Assignee: Nupro Company, Cleveland, Ohio

[22] Filed: June 14, 1973

[21] Appl. No.: 370,001

Related U.S. Application Data
[63] Continuation-in-part of Ser. No. 272,561, July 17, 1972.

[52] U.S. Cl............................................ 251/335 B
[51] Int. Cl............................................ F16k 41/10
[58] Field of Search.................... 251/335 B, 357

[56] References Cited
UNITED STATES PATENTS

| | | | |
|---|---|---|---|
| 2,907,548 | 10/1959 | Maas et al. | 251/357 X |
| 2,659,569 | 11/1953 | Ehlke | 251/335 B |
| 2,659,570 | 11/1953 | Werker et al. | 251/335 B |
| 2,628,638 | 2/1953 | Herod et al. | 251/335 B |
| 2,852,041 | 9/1958 | Stinson | 251/335 B |
| 3,491,789 | 1/1970 | Callahan, Jr. et al. | 251/335 B |

*Primary Examiner*—Henry T. Klinksiek
*Attorney, Agent, or Firm*—Fay, Sharpe and Mulholland

[57] ABSTRACT

The specification and drawings disclose a valve particularly suited for use in critical vacuum systems. The valve shown comprises a body having a through flow passage of generally circular cross-section. A butterfly valve disc is positioned in the passage and has an outer periphery adapted to close the passage when rotated to a position transverse to the axis of the passage. A rotatable operating stem is connected to the valve disc and extends outwardly through the body. Joined with the operating stem is an actuating stem which has an outer end portion inclined at an angle relative to the axis of the operating stem. A bellows assembly encloses the actuating stem with a lower portion of the assembly joined to the body. The bellows assembly includes a flexible, gas impervious bellows member which encloses the actuating stem and is inclined throughout a portion of its length at an angle corresponding to the angle of the inclination of the outer end portion of the actuating stem. Additionally, the outer end of the bellows is rotatably engaged with the outer end of the actuating stem. Means are provided in the form of a rotatable housing member for applying a generally radially acting force to the outer end of the bellows assembly to produce rotation of the operating stem and deflection of the bellows without torsional loading of the bellows.

6 Claims, 7 Drawing Figures

FIG. I
FIG. 2
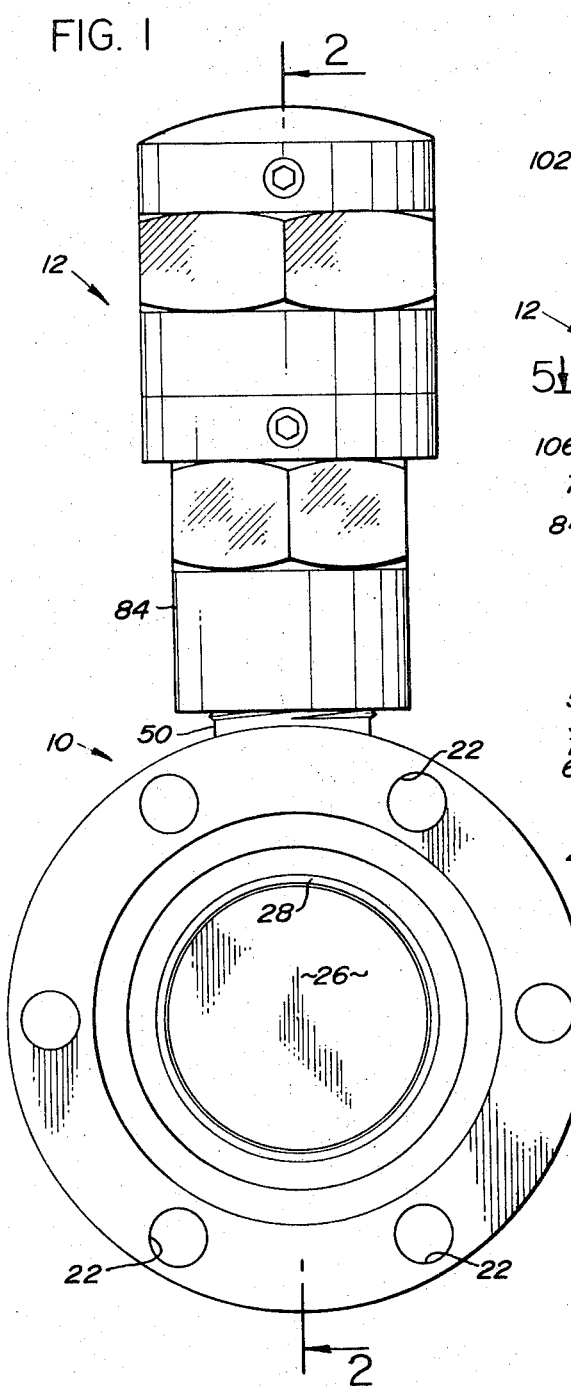
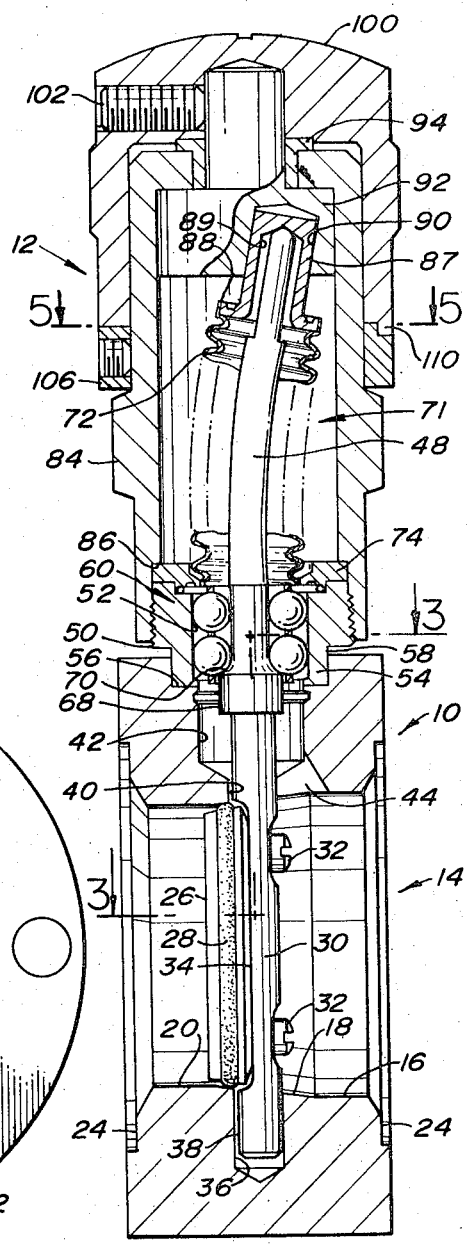

BELLOWS SEALED BUTTERFLY VALVE

This application is a continuation-in-part of U.S. Pat. application Ser. No. 272,561, filed July 17, 1972.

The subject invention is directed toward the valve art and, more particularly to an improved butterfly valve.

The invention is especially suited for use as a high vacuum valve and will be described with particular reference thereto; however, as will become apparent, the invention could be used for many different types of service.

Generally, in systems where it is desired to achieve vacuums below $10^{-6}$ Torr, it is not practical to use valves having rubber or the like seals between the system and the atmosphere. The reason for this is that there is a permeability problem which results in the migration of molecules of unknown impurities through the rubber seals and subsequent introduction of them into the vacuum system. As a consequence, the use of statically sealed valves is preferred. Statically sealed valves are, of course, already known in connection with high vacuum service. Customarily, the statically sealed valves are of the reciprocal stem type sealed with a bellows or diaphragm. Although reciprocal valves are generally satisfactory, they do have certain disadvantages in that they are not particularly quick acting and they have low conductance.

Butterfly valves are theoretically ideal for vacuum systems because they are quick acting, have high conductance, and are generally more compact and more simply constructed than reciprocal valves. The main difficulty with using buterfly valves in vacuum systems has been that none are available which are statically sealed. The primary reason for this is that bellows and diaphragms which can be used in statically sealed systems are not usable in torsion. That is, it is not generally possible to satisfactorily transmit a rotating force through a bellows or diaphragm as is required to shift a butterfly valve. As a consequence, butterfly valves generally require the use of rubber or plastic stem seals which suffer from the disadvantage of molecular migration into the vacuum system.

The subject invention overcomes the above problems and provides a buterfly valve which is statically sealed and does not require any type of rotary seal, resilient gaskets or the like. All joints in the operating assembly can be metal-to-metal seals, bonded or welded, if desired. Further, the assembly is arranged so that when used in a vacuum system, there is little chance of virtual leaks because the operating portion of the assembly is designed for easy pump-down.

Specifically, and in accordance with the invention, the valve provided contemplates a body having a through flow passage of generally circular cross-section. A valve disc member is positioned in the passage and has an outer periphery adapted to close the passage when rotated to a position transverse to the axis of the passage. A rotatable operating stem is connected to the valve disc and extends outwardly through the body. Formed integrally with the operating stem or positively connected thereto is an actuating stem which has an outer end portion inclined at an angle relative to the axis of the operating stem. A bellows assembly encloses the actuating stem with a lower portion of the assembly joined to the body such as by being clamped or welded thereto. The bellows assembly includes a flexible, gas impervious bellows member which encloses the actuating stem and is inclined throughout a portion of its length at an angle corresponding to the angle of the inclination of the outer end portion of the actuating stem. Additionally, the outer end of the bellows is rotatably engaged with the outer end of the actuating stem. Means are provided in the form of a rotatable housing member for applying a force generally radially acting to the outer end of the bellows assembly and generally tangentially acting to the effective moment arm created by the actuating stem so that rotation of the operating stem is produced without torsional loading of the bellows. Because of this arrangement, there are no rotating seals between the actuating assembly and the body of the valve. Moreover, the entire inner portion or interior of the bellows assembly can be open to the flow passageway through the valve body so as to facilitate pump-down when the valve is used in a critical vacuum system.

Another aspect of the invention contemplates that the valve disc and operating stems are somewhat freely floating in the body so that the disc has a self-centering action. Preferably, the actuating and operating stems are guided by bearing means located at least two spaced points but arranged so as to permit some axial movement of the stems.

Accordingly, a primary object of the invention is the provision of a bellows sealed butterfly valve in which there are no rotary or reciprocal stem seals.

Yet another object is the provision of a butterfly valve particularly suited for critical vacuum systems and arranged so that virtual leaks are minimal, pump-down is efficient, and all seals between the vacuum system and atmosphere can be metal-to-metal or bonded.

A still further object of the invention is the provision of a valve of the general type described which is relatively simple to manufacture and highly reliable in operation.

The above and other objects and advantages will become apparent from the following description when read in conjunction with the accompanying drawings wherein:

FIG. 1 is an elevational view showing a preferred embodiment of a valve formed in accordance with the invention;

FIG. 2 is an enlarged cross-sectional view taken on line 2—2 of FIG. 1 and showing the valve in a closed position;

Figure 3:
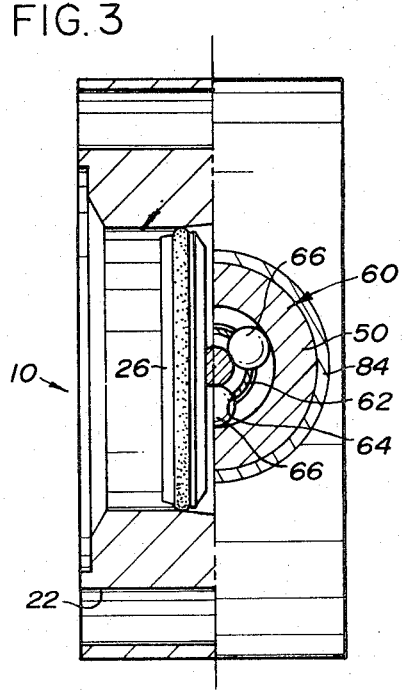
FIG. 3 is a cross-sectional view taken on line 3—3 of FIG. 2.

Referring more particularly to FIGS. 1 and 2 of the drawings, the valve is shown as including a body 10 and an actuating assembly 12 which is connected to the body and extends outwardly therefrom. In the subject embodiment, the body 10 is formed as one piece of cylindrical cross-section and provided with an axially extending through passage 14. Passage 14 includes a first cylindrical section 16, a tapered, seat defining section 18 and a cylindrical section 20. It will be noted that a spaced series of bolt holes 22 are provided for connecting the body to standard vacuum flanges. Further, gasket recesses 24 are formed about the outer ends of the passageway to receive a standard soft metal gasket of the type typically used in high vacuum systems. Although not shown, the recesses 24 are normally provided with some type of gasket engaging protuberances. It should be appreciated that other types of connecting arrangements could equally well be provided, depending upon system requirements, etc.

Positioned within the through passage 14 is a circular valve disc 26 formed from any suitable material and having a peripherally extending seal 28 carried thereon. The seal can be formed from many materials depending upon the system requirements; however, some of the new fluorocarbon compounds are particularly satisfactory. The disc itself is, in the preferred embodiment, formed from stainless steel and is connected to an operating stem 30 by a pair of screws 32. Screws 32 extend through openings formed in the stem 30 into tapped openings in the disc 26. The screws 32 are preferably slotted throughout their length to provide an air passage along the threads to facilitate pump-down and help prevent virtual leaks in the valve. (A virtual leak results from gas being trapped in a small cavity or the like and slowly leaking therefrom during use of the valve in a high vacuum environment.)

As shown, the stem 30 is preferably provided with a flat 34 which engages the face of the valve disc and holds it positioned.

The lower end of stem 30 is relatively loosely received within a bore 36 formed in the valve body 10. It should be noted that the length of the lower end portion of stem 30 is less than the total depth of the bore 36. This permits some vertical freedom so that the disc and stem assembly can be somewhat self-centering. Further, a flat 38 is formed longitudinally along the lower end of the stem to provide an air passage.

The upper end of the operating stem 30 passes through an opening 40 which connects with an enlarged counterbore 42. Adjacent the opening 40, a slot 44 is formed through the body so as to provide free communication with the counterbore 42.

The upper end of stem 30 is directly connected with the actuating stem 48. In the embodiment under consideration, the operating stem 30 and the actuating stem 48 are formed integrally from a single piece of stock; however, these can obviously be formed as separate elements and positively interconnected, if desired. The details and arrangement of the operating stem 48 will subsequently be described.

A bonnet member 50 with a centerbore 52 of a diameter substantially equal to the diameter of the counterbore 42 is joined to the valve body. In the subject embodiment, the bonnet member 50 has an axially extending sleeve portion 54 which mates with a recess 56 formed about the outer end of conterbore 42. Preferably, the sleeve is welded to the body about the joint 58 as shown in FIG. 2.

The operating stem 30 and the actuating stem 48 are guided in the bonnet member 50 by a bearing means 60. Many different types of bearings could be used, for example, simple sleeve bearings or the like; however, in the subject embodiment, a ball bearing assembly is shown. In particular, as seen in FIG. 3, bearing means 60 comprises a cylindrical sleeve 62 having a plurality of openings 64 formed therethrough. Balls 66 are received in the openings and are sized so as to engage the inner wall of the bore 52 and the outer surface of the actuating stem 48. As best shown in FIG. 2, at the juncture between the actuating stem 48 and the operating stem 30, there is a radially extending flange 68 having a fillet 70. The lower balls in the assembly rest on the flange 68 for support in the bore 52. This particular bearing assembly is excellently suited for the specific application. It creates few, if any, virtual leaks, it leaves wide-open paths for pump-down, and it properly supports the stems so they can transform a linear force into rotary motion with little wear or frictional loss without the use of lubricants which would be undesirable in a high-vacuum system.

Of particular importance to the invention is the arrangement of the actuating assembly 12 whereby the operating and actuating stems can be given a rotary motion without the need for a rotary seal. Referring in particular to FIG. 2, it will be seen that the actuating stem 48 has its outer end portion bent at an incline relative to the axis of rotation of stem 30. In the subject embodiment, the incline is shown as in the range of approximately 10° to 20°; however, this could obviously vary.

Figure 4:
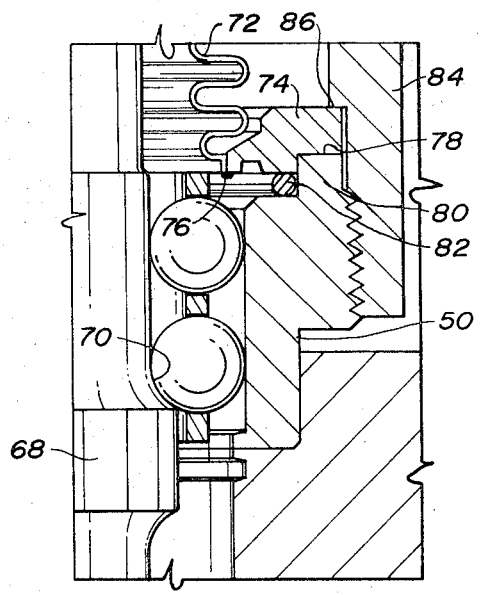
FIG. 4 is an enlarged view of bearing means 60 of FIG. 2.

Enclosing the actuating stem 48 is a bellows assembly 71 which includes a gas impervious, flexible metal bellows member 72. The bellows member 72 has an open lower end which is connected to the bonnet member 50. The connection between the lower end of the bellows member 72 and the bonnet member 50 is best shown in FIG. 4. It will be noted that a relatively rigid annular flange member 74 is joined about the lower edge of bellows 72 and extends radially outwardly therefrom. Preferably, the flange member 74 is fusion bonded to the bellows as shown at 76. The member 74 extends outwardly over a small recess 78 formed about the top surface of the bonnet member 50. It will be seen that a small, upwardly extending flange 80 is positioned about the top of bonnet member 50 and acts as a positioning flange or shoulder for a metal O-ring 82 and for flange member 74. Metal O-ring 82 serves as a seal between the bonnet member 50 and the flange 74. Referring again to FIG. 2, it will be seen that a clamp or bonnet nut member 84 is threadedly connected to the bonnet member 50 and has an inwardly extending shoulder 86 which, as shown in FIG. 4, engages the top surface of the flange 74. By tightening the bonnet nut 84, substantial sealing pressure is applied to form a tight metal-to-metal seal between the metal O-ring, the top of the bonnet member 50 and the under surface of flange 74. In certain instances, the metal O-ring could be eliminated and a tight metal-to-metal seal made between the flange 74 and the top of the bonnet member 50. Flange member 74 also could be fusion bonded to bonnet member 50.

As previously mentioned, the upper end portion of bellows member 72 is inclined at an angle corresponding to the angle of inclination of the outer end of actuating stem 48. As shown, the end of bellows 72 is closed by a generally cup-shaped cap member 87 which has a laterally extending flange 88 welded or otherwise positively and sealingly joined to the upper edge of bellows 72. The outer free end of the actuating stem 48 is rotatably received and guided within the rigid cap member 87. A bore 89 is formed inwardly of cap member 87 and receives the free end of actuating stem 48.

The cap member 87 is rotatably received in a bore 90 which is formed at a corresponding angle in a member 92. Member 92 is rotatably received in the upper end of member 84. As shown, a reduced diameter end portion of member 92 extends outwardly through a sleeve bearing 94 carried in member 84.

With the arrangement thus far described, rotation of member 92 applies a lateral force to the cap member 87 and will produce rotation of the stem and consequent rotation of the valve disc 26. Because of the rotating connection between the actuating stem 48 and the cap member 87, the rotation of the stem takes place with only lateral deflection of the bellows. That is, the bellows does not rotate or undergo any torsional loading. Thus, all connections between the bellows and the valve body can be positive, nonrotating connections. Consequently, the valve is particularly suited for critical vacuum uses where rotary seals are not satisfactory.

Although the assembly thus far described could be used without additional structure, it is preferable to provide a cupshaped handle member 100 that is connected to the reduced diameter portion of member 92. As shown, handle member 100 is releasably connected by a set screw 102. Although the embodiment shown is intended for manual operation, it could obviously be used with various types of power actuators, air, electric or the like.

Figure 5:
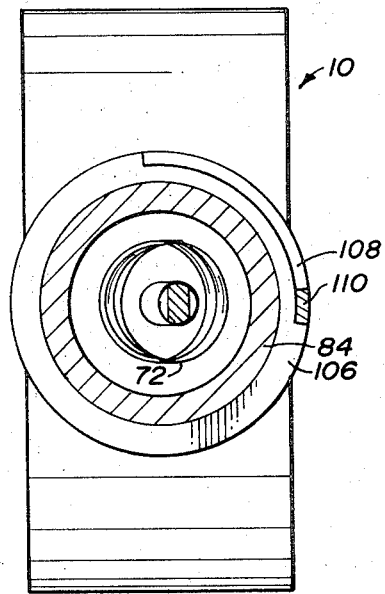
FIG. 5 is a view taken on line 5—5 of FIG. 2.

In order to provide positive stops for the movement of the disc, a stop member 110 extends downwardly from handle 100 (see FIGS. 2 and 5). A ring member 106 is connected to bonnet nut member 84 and has a groove 108. The groove 108 has a circumferential extent of approximately 90° and receives the end of the stop member 110. As shown in FIG. 5, this limits the extent of movement of the valve disc to a first closed position (shown solid) and a second open position.

Figure 6:
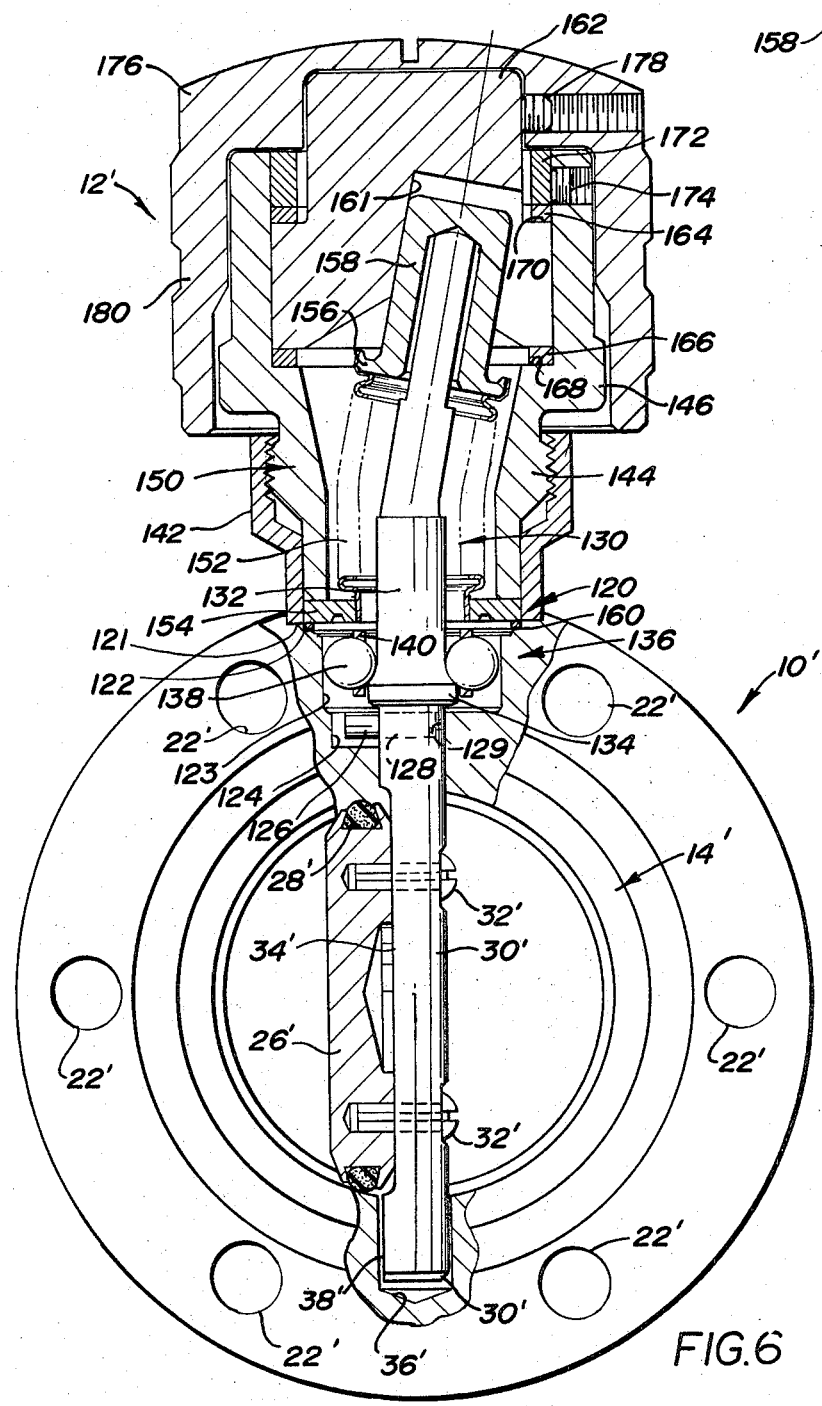
FIG. 6 is an elevational view (partially in section) showing a second embodiment of the invention (in this view the valve is shown in the open position); and, FIG. 7 is a partial cross-sectional view showing a slightly modified form of actuator assembly for the FIG. 6 embodiment.

FIG. 6 illustrates a second embodiment of the valve formed in accordance with the subject invention. The valve of FIG. 6 is generally similar in overall construction and operation to the FIGS. 1–5 embodiment. Differences, however, reside primarily in the actuating portion of the valve. The differences are such as to permit the overall height of the valve to be reduced from that of the FIGS. 1–5 embodiment. Additionally, the actuator arrangement is such that a somewhat more rigid and stable actuation is achieved than with the FIG. 1 embodiment. Certain other differences will become apparent.

In general, the valve of the FIG. 6 embodiment comprises a body section 10' and an actuator section 12'. The body section 10' is substantially identical to that described with respect to FIGS. 1–5 embodiment. Accordingly, like reference numerals have been used to identify corresponding parts or components of the FIG. 6 embodiment. A description of a correspondingly numbered element of the FIGS. 1–5 embodiment is to be taken as equally applicable to the FIG. 6 embodiment unless otherwise noted.

In the FIG. 6 embodiment, the stem 30' extends outwardly of the body through an opening 120 which is formed slightly different from the corresponding opening of the first embodiment. As shown, opening 120 includes three stepped diameter portions 121, 122 and 123. A 90-degree slot or recess 124 is formed in the bottom wall of portion 123 and serves as a stop to limit for movement of stem 30'. A stop pin 126 extends outwardly from stem 30' for engagement with the ends of slot 124. Although not of particular importance to the invention, it should be noted that pin 126 is received in an opening 128 formed in stem 30'. Opening 129 serves to facilitate pump-down when the valve is used in vacuum systems so that air trapped beneath pin 126 will be evacuated and will not present virtual leak problems.

The operating portion 130 of stem 30' includes a somewhat larger diameter portion 132 having a radially outwardly extending flange 134. The upper surface of flange 134 is curved as shown and supports a ball bearing assembly 136. In this embodiment, the ball bearing assembly 136, although similar to the previously mentioned ball bearing assembly 60, differs therefrom in that it comprises a single row of ball members 138 maintained in position by a retainer 140 which is merely a metal sleeve having spaced openings adapted to rotatably receive the ball members 138. The ball bearing assembly 136 rotatably supports the upper end or actuating portion of stem 30'.

Received in the outer section 121 of opening 120 is a bonnet member 142. The lower end of bonnet member 142 is welded or otherwise positively joined to body 10' as shown. A bonnet nut member 144 is threadedly received in the outer end of bonnet member 142. Suitable wrench-receiving flats or the like 146 are formed about the bonnet nut member 144 so that it may be tightened or removed from the bonnet member 142.

Positioned over the inclined upper end of the actuating stem 30' is a bellows assembly 150 which is generally identical to the previously-discussed bellows assembly 71. As shown, bellows assembly 150 includes a metal bellows member 152 welded at its lower end to a flange member 154. At its upper end, bellows 152 is welded otherwise positively and sealingly joined to the lower flanged end 156 of a cap member 158. As illustrated, the flange member 154 is clamped to the body by the lower end of the bonnet nut member 144. A seal is formed between the lower face flange member 154 and the body 10' by an O-ring member 160 (preferably metal) positioned in recess 122 of opening 120.

The cap member 158 rotatably receives the upper end of the actuating portion 130 of stem 30'. Cap member 158 is rotatably received in an opening 161 formed in an actuating member 162. As can be appreciated, rotation of actuating member 162 applies a lateral force to the cap member 158 to produce rotation of the stem and rotation of the valve disc 26'. As discussed with reference to the FIGS. 1–5 embodiment, since there is a rotating connection between the actuating portion 130 of stem 30' and cap member 158, the rotation of the stem takes place with only lateral deflection of the bellows. For this reason, the bellows does not rotate or is not subject to any torsional loading and has a particularly long and reliable life.

The actuating member 162 is rotatably held in the bonnet nut member 144 between a pair of thrust bearing washer members 164 and 166. Preferably, the thrust bearing members are formed from a suitable bearing material such as bronze or the like. It should be noted that the lower bearing washer 166 rests on a shoulder 168. The upper bearing member 164 rests on the upper surface of shoulder 170 formed on the actuating member 162. The actuating member 162 and the thrust bearings 166 are prevented from moving outwardly while being permitted to rotate freely by a collar member 172 which is releasably locked in the upper end of the bonnet nut member 144 in any convenient manner such as by a set screw 174.

Preferably, the actuator also includes a handle member 176 which encloses the upper end of the actuating member 162 and is releasably connected thereto by a set screw 178. In the embodiment shown, the handle member 176 includes a downwardly-extending flange portion 180 which is closely received on the outer portion of the upper end of nut member 144.

Figure 7:
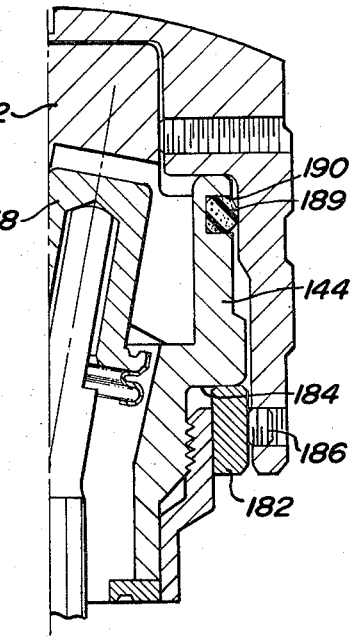

FIG. 7 illustrates a slightly modified form for the actuating assembly of the FIG. 6 embodiment. In this embodiment, the overall height of the actuating assembly is further reduced by elimination of the thrust bearing washer members 164 and 166, as well as the collar member 172. This permits the reduced diameter end portion of the actuating member 162 and the upper end of the bonnet nut member to be reduced in height. The actuator member 162 is held in position in the bonnet by a retaining sleeve member 182 which is rotatably received on the outer surface of the bonnet 142 and engages the shoulder 184 formed on bonnet nut member 144. The sleeve member 182 is locked to the extended lower portion of handle sleeve or flange 180 by a set screw 186. It is, of course, appreciated that the handle thus serves to maintain the actuating member 162 firmly in position in the bonnet nut member 144. Preferably, both the actuating member 162 and the sleeve 182 should be made from materials which are suitable as bearings in relationship to the bonnet nut member 144.

FIG. 7 also illustrates the manner by which the handle actuating movement can be stabilized or dampened. For example, an O-ring 189 can be carried in a groove 190 formed about the upper portion of bonnet nut member 144. By properly sizing the O-ring relative to the groove 190, a sufficient portion of the O-ring can extend out of the groove to engage the inner surface of the handle 176. The O-ring 189 is not intended to perform any sealing functions but, rather, merely dampens or applies a slight frictional force to the movement of handle 180.

In both the FIGS. 6 and 7 embodiment, separate bonnet and bonnet nut members are provided. In certain environments, however, it may be advisable to form these two parts integrally and weld them to both the flange member 154 and the valve body. This has the advantage of eliminating the necessity of a sealing O-ring member 160.

The invention has been described in great detail sufficient to enable one of ordinary skill in the valve art to make and use the same. Obviously, modifications and alterations of the preferred embodiment will occur to others upon a reading and understanding of the specification and it is our intention to include all such modifications and alterations as part of our invention insofar as they come within the scope of the appended claims.

What is claimed is:

1. A valve comprising:
   a body having a through flow passage of generally circular cross-section and a longitudinal axis;
   a valve member positioned in said passage and adapted to open and close said passage when rotated between a first position and a second position about an axis of rotation generally perpendicular to the axis of said passage;
   a rotatable operating stem defining said axis of rotation and connected to said valve member and extending radially outwardly through said body;
   an actuating stem positively connected to said operating stem and having an outer end portion inclined relative to the axis of rotation of said operating stem;
   a bellows assembly enclosing said actuating stem and having a lower end portion joined to said body and an outer end portion inclined at an angle generally corresponding to the angle of said actuating stem and rotatably engaged therewith;
   actuating means for applying a generally radially acting force to the outer end of said stem whereby rotation of said stem produces deflection of said bellows substantially without torsional loading of said bellows;
   said actuating means including an actuating member mounted for rotation about the axis of rotation of said operating stem, said actuating member having an inclined opening receiving the outer end of said bellows assembly;
   a bonnet extending upwardly from said body and enclosing said bellows assembly, said bonnet carrying at least one thrust bearing surface which engages a portion on said actuating member;
   retaining means for holding said actuating member against said one thrust bearing surface; and,
   a handle member connected to said actuating member and having a downwardly extending flange portion rotatable about said bonnet.

2. The valve as defined in claim 1 wherein said thrust bearing surface extending circumferentially about said actuating member.

3. The valve as defined in claim 1 including a resilient member positioned between said handle member and said bonnet to frictionally retard movement of said handle.

4. The valve as defined in claim 1 wherein there are two of said thrust bearing surfaces positioned on axially opposite ends of a radially extending portion of said actuating member.

5. The valve as defined in claim 1 wherein said bonnet includes a radially outwardly extending shoulder and wherein said handle extends below said shoulder and a retaining sleeve is connected to said handle beneath said shoulder.

6. The valve as defined in claim 1 wherein said retaining means comprises a sleeve member carried by said handle member.

* * * * *